(12) United States Patent
Gray et al.

(10) Patent No.: US 6,646,990 B1
(45) Date of Patent: Nov. 11, 2003

(54) DISTRIBUTED TECHNIQUE FOR ALLOCATING CALLS

(75) Inventors: Thomas Gray, Carp (CA); Sonya Fullarton, Ottawa (CA)

(73) Assignee: Mitel Corporation (CA)

( * ) Notice: Subject to any disclaimer, the term of this patent is extended or adjusted under 35 U.S.C. 154(b) by 0 days.

(21) Appl. No.: 09/455,658

(22) Filed: Dec. 7, 1999

(30) Foreign Application Priority Data

Dec. 9, 1998 (GB) .............................................. 9827158

(51) Int. Cl.[7] .............................................. H04L 12/28
(52) U.S. Cl. .................. 370/238; 370/351; 379/221.02; 709/241
(58) Field of Search ............................ 379/219, 220.01, 379/221.01, 221.05, 221.02, 221.06; 370/225, 392, 238, 252, 351; 709/238, 241

(56) References Cited

U.S. PATENT DOCUMENTS

| | | | | |
|---|---|---|---|---|
| 4,791,665 A | * | 12/1988 | Bogart et al. .......... | 379/221.02 |
| 5,289,536 A | | 2/1994 | Hokari | |
| 5,323,394 A | * | 6/1994 | Perlman .................... | 370/238 |
| 5,425,084 A | * | 6/1995 | Brinskele ................ | 379/114.02 |
| 5,452,351 A | * | 9/1995 | Yamamoto ............. | 379/115.01 |
| 5,515,425 A | * | 5/1996 | Penzias et al. ......... | 379/114.02 |
| 5,539,815 A | | 7/1996 | Samba | |
| 5,606,602 A | * | 2/1997 | Johnson et al. ........ | 379/114.02 |
| 5,675,636 A | * | 10/1997 | Gray ....................... | 379/114.15 |
| 5,917,897 A | * | 6/1999 | Johnson et al. ........ | 379/114.02 |
| 6,005,925 A | * | 12/1999 | Johnson et al. ........ | 379/115.02 |
| 6,078,652 A | * | 6/2000 | Barak ..................... | 379/114.02 |
| 6,295,350 B1 | * | 9/2001 | Schreyer et al. ....... | 379/221.01 |
| 6,345,090 B1 | * | 2/2002 | Walker et al. ......... | 379/114.12 |

FOREIGN PATENT DOCUMENTS

| | | |
|---|---|---|
| GB | 2249000 | 4/1992 |
| GB | 2289599 | 11/1995 |
| WO | 9717815 | 5/1997 |
| WO | 9739592 | 10/1997 |
| WO | WO 97/39592 | 10/1997 |
| WO | 9839909 | 9/1998 |

OTHER PUBLICATIONS

Stevens, Richard W., "TCP/IP Illustrated vol. 1", 1994, Addison Wesley, pp. 129–134.*

* cited by examiner

*Primary Examiner*—Alpus H. Hsu
*Assistant Examiner*—Michael J. Molinari
(74) *Attorney, Agent, or Firm*—Jones Day

(57) ABSTRACT

A method for minimizing toll call costs for completing a call at an originating PBX within a network of connected PBXs to a remote destination, comprising the steps of generating within the originating PBX and communicating to each other PBX within the network a message calling for bids from each PBX for least cost routing of the call according to respective local routing plans, determining within the originating PBX a least cost direct route for completing the call, determining from the respective local routing plans the least cost routing for each other PBX and communicating the bids to the originating PBX, and comparing and in response selecting within the originating PBX a least costly one of the least cost direct routes and the least cost routing for each other PBX for completing the call to the remote destination.

3 Claims, 1 Drawing Sheet ial number of PBXs in the network ensures a finite number of
DISTRIBUTED TECHNIQUE FOR ALLOCATING CALLS

FIELD OF THE INVENTION

The present invention relates in general to communication switching systems and more particularly to a method for minimizing total toll call costs for a distributed network of PBXs.

BACKGROUND OF THE INVENTION

It is well known in present day PBXs to provide Automatic Route Selection (ARS) or Least Cost Routing (LCR) for outgoing calls. Normally, the call processing necessary to fulfill these functions includes a table look-up of trunks identified by a plurality of exchanges and the costs of making calls over the respective trunks. In a simple system, the trunks are ranked in order of priority. In more complex systems, alternate routings are provided when the least cost route is busy or during specified times of day.

U.S. Pat. No. 5,675,636 (Gray) provides an Automatic Route Selection (ARS) algorithm whereby the decision on call assignments to trunks is done dynamically, rather than being done according to a fixed plan or route list. Consequently, advantage can be taken of dynamic revaluation of route plans in relevant circumstances such as call volume discounts. The invention is implemented using software agents which bid to have calls assigned to their trunks by means of poking tuples and anti-tuples into tuple space (i.e. shared memory).

Although the aforenoted patent of Gray provides a solution for minimizing costs in a stand-alone PBX environment, many enterprises utilize a distributed network of PBXs. Considerable cost savings can be achieved in such networked systems utilizing similar features. For example, taking into account tariffs for international calls and tie lines, in some circumstances it may be most cost effective to route a call from one PBX to another PBX in the network and utilize a national toll route rather than an international route directly from the first PBX. For another example, it may be cheaper to direct a call through paid-for private routes through the network of PBXs instead of a toll call from the originating PBX.

It is an aspect of the present invention to provide a method for minimizing total toll call costs for a distributed network of PBXs in which cost information concerning competitive routing plans available at the individual PBXs is shared.

SUMMARY OF THE INVENTION

According to the present invention, a method is provided for minimizing the total cost of trunk toll calls for a distributed network of PBXs. An originating PBX proposes a toll call to all connected PBXs in the network and requests the cost of the toll call. Each PBX then proceeds to perform the same task until all possible routes between the originating PBX and a toll call destination is found. Each PBX then proceeds to select the least expensive toll call among the many possibilities (preferably using the method disclosed in U.S. Pat. No. 5,675,636) and informs the originating PBX of the choice. The originating PBX selects the least expensive route and completes the toll call.

BRIEF DESCRIPTION OF THE DRAWINGS

An embodiment of the invention is described below with reference to the accompanying drawings, in which.

DETAILED DESCRIPTION OF THE PREFERRED EMBODIMENT

Figure 1:
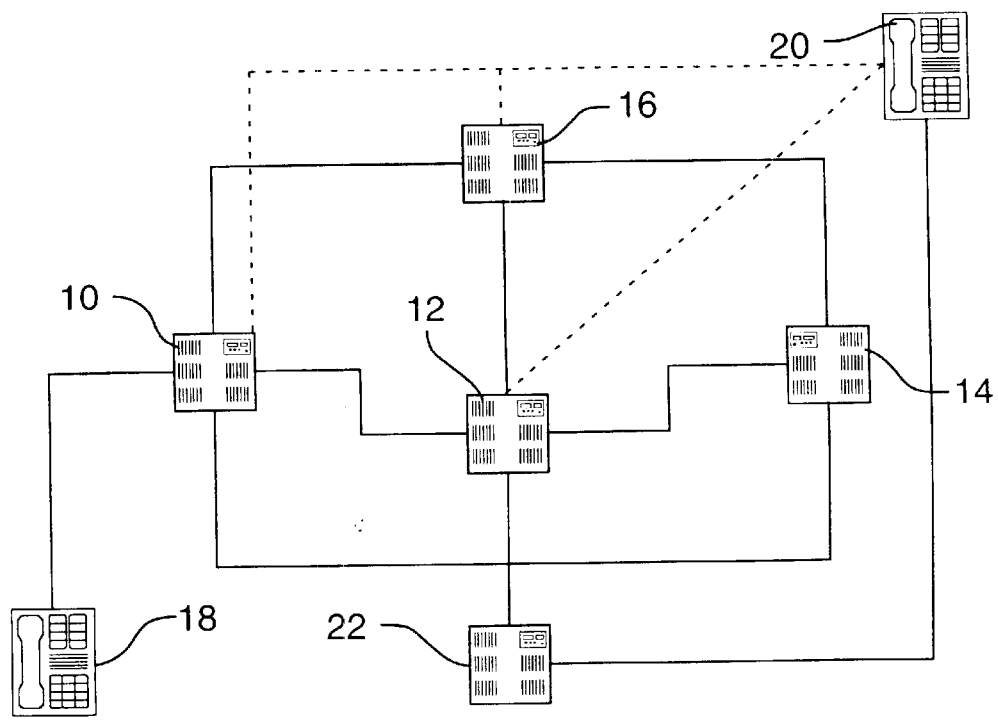
FIG. 1 is a diagram showing a distributed network of five PBXs.

In FIG. 1, a diagram is provided of a distributed network of five PBXs. The network is restricted to five PBXs in the illustrated example but may include any number of PBXs greater than one. Each PBX (PBX 10, PBX 12, PBX 14, PBX 16 and PBX 22) is provided with an agent architecture for implementing a system for the local selection of competitive plans, preferably as described in detail in U.S. Pat. No. 5,675,636, entitled Adaptive Method for Allocating Calls, the contents of which are incorporated herein by reference. However, it will be appreciated that any appropriate selection method may be implemented within the individual PBXs provided that the method is capable of returning a cost based on calling plans.

In the preferred embodiment, a first telephone 18 (referring to a first party) attempts to complete a toll call to a second telephone 20 (referring to a second party). As discussed above, PBX 10 is provided with appropriate software agents for determining a least cost route from the first telephone 18 to the second telephone 20 through any number of the other PBXs (PBX 12, PBX 14, PBX 16 and PBX 22) or via direct toll call, WATS line, etc. To select the minimum cost plan, PBX 10 selects from among its own plans the cheapest route and then uses the plans of the other PBXs (PBX 12, PBX 14, PBX 16 and PBX 22) to determine whether the call can be more inexpensively completed via tandem connection of one or more of the networked PBXs than via the calculated least call direct route from the first telephone 18 to the second telephone 20.

After telephone 18 has dialed the number for telephone 20, the PBX 10 sends a message to the connected PBXs (PBX 12, PBX 14, PBX 16 and PBX 22) for initiating costing agents therewithin to assess the cost of the call. Each PBX 12, 14, 16 and 22 individually proceeds to select the cheapest direct route to the second party 20 using itself as the starting point, and sends a message in the form of a bid to all connected PBXs proposing the call. For example, PBX 10 sends a message to PBXs 12, 14, 16 and 22. After determining the least expensive route between PBX 12 and the second telephone 20, PBX 12 sends a call for bids message to PBXs 10, 14, 16 and 22. When the process is complete, each of PBX 12, PBX 14, PBX 16 and PBX 22 determines the least expensive route from the respective PBX to the second party and reports back to the originating PBX by returning a bid message. The originating PBX 10, compares the costs of all of the reported routes with the cost of the least cost direct route plan (i.e. directly from telephone 18 to telephone 20) and selects the least expensive route. As indicated herein above, the decision methodology implemented by the PBX 10 is as disclosed in U.S. Pat. No. 5,675,636. Since each PBX sends a bid message to all of the connected PBXs, the system according to the present invention is able to detect all unique connections to the destination including the ones that pass through the networked PBXs.

A problem can arise in the system of the present invention wherein indefinite looping of the trunking requests can occur within the PBX network. An example of this problem occurs when PBX 10 asks PBX 12 for a route to a selected destination and PBX 12 asks PBX 10 for the same information. The cyclic sending of messages would continue indefinitely, without appropriate safeguards. Therefore, according to an aspect of the invention the identity of all PBXs through which the request has already passed is preferably placed in each message to the costing agent of another PBX. In practice, this would be a simple matter of repeating the same message and adding the identity of the current PBX to the message. This would prevent PBX 12 (in the example above) from resending the message back to PBX 10. An alternative would be to have the PBX examine the PBX list in the message and only forward the message to the PBXs to which it is connected which do not appear in the message PBX list.

Figure 2:
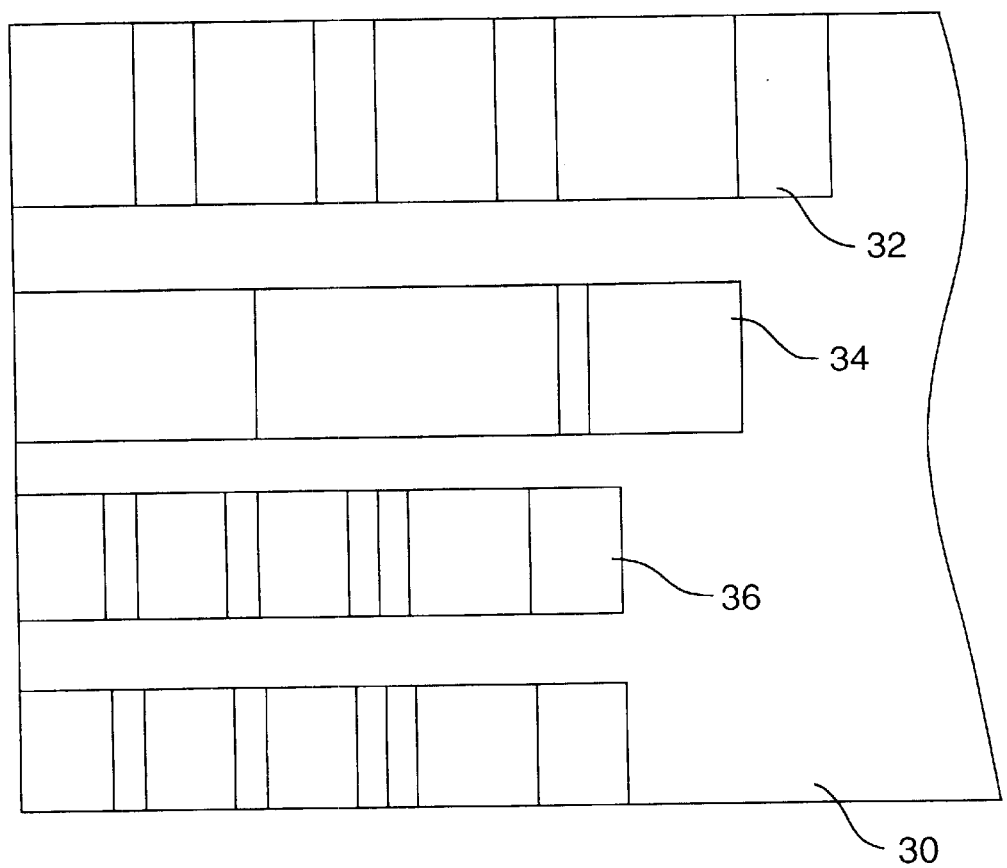
FIG. 2 is a diagram showing the memory within one of the PBXs.

Turning to FIG. 2, a drawing is provided showing a shared memory 30 located within the originating PBX 10. The memory 30 includes a first partition area 32 for defining the toll call, a second partition 34 for transmitting and receiving messages and a third partition 36 for containing the different costs of the toll call as provided by the other PBXs.

The first partition 32 contains the number of the toll call, a new call semaphore, a call allocated semaphore, a start assessment semaphore and call and trunk ids. A semaphore is a software synchronization tool for ensuring that programs are run in order.

The second partition 34 is responsible for proposing the call to connected PBXs and for receiving the least expensive toll call cost from connected PBXs.

The third partition 36 keeps track of the bids received from connected PBXs and selects the least expensive toll call from all of the possibilities.

The message and information flow for the preferred embodiment as described in connection with FIGS. 1 and 2, is as disclosed in U.S. Pat. No. 5,675,636 with the addition of the list of PBXs through which the request has already passed. One further departure from the system of U.S. Pat. No. 5,675,636, which is necessary to implement ARS in a networked PBX environment, is in the timing of the auction for bids. As with the system disclosed in U.S. Pat. No. 5,675,636, a definite time limit needs to be enforced for conclusion of the auction in order to prevent an indefinite wait for plans from other PBXs in the event that such PBXs for some reason either cannot or will not respond. However, this time limit will be longer than the time limit imposed on the determination of local plans so that the local call routing data can be gathered and consolidated in each bid sent back to the originating PBX before expiry of the time limit for conclusion of the auction.

It will be appreciated that, although a particular embodiment of the invention has been described and illustrated in detail, various changes and modifications may be made. All such changes and modifications may be made without departing from the sphere and scope of the invention as defined by the claims appended hereto.

What is claimed is:

1. A method for minimizing toll call costs for completing a call at an originating PBX within a network of connected PBXs to a remote destination, comprising;

a) generating within said originating PBX and communicating to each other PBX within said network a message calling for bids from each other PBX for least cost routing of said call according to respective local routing plans;

b) determining within said originating PBX a least cost direct route for completing said call;

c) determining from said respective local routing plans the least cost routing for each said other PBX and communicating said bids to said originating PBX;

d) comparing and in response selecting within said originating PBX a least costly one of said least cost direct route and said least cost routing for each said other PBX for completing said call to said remote destination; and e) imposing a first time limit for said step of determining from said respective local routing plans said least cost routing, and a second time limit for the steps of generating and communicating said message and selecting said least costly one of said least cost direct route and said least cost routing, wherein said first time limit is less than said second time limit.

2. The method of claim 1 wherein said message is transmitted successively from one said other PBX to a next said PBX.

3. The method of claim 2, further comprising the step of appending a list to said message at each said other PBX identifying each said other PBX to which said message has already been communicated.

\* \* \* \* \*